United States Patent [19]
Glynn et al.

[11] Patent Number: 5,197,857
[45] Date of Patent: Mar. 30, 1993

[54] MULTIPLE ROTOR DISK ASSEMBLY

[75] Inventors: Christopher C. Glynn, Hamilton; Martin C. Hemsworth, Cincinnati, both of Ohio

[73] Assignee: General Electric Company, Cincinnati, Ohio

[21] Appl. No.: 710,989

[22] Filed: Jun. 6, 1991

[51] Int. Cl.$^5$ .......................... B63H 1/20; B63H 5/00
[52] U.S. Cl. ............................ 416/204 A; 416/210 A; 416/213 R; 416/219 R; 416/220 R
[58] Field of Search ........... 416/198 R, 198 A, 204 R, 416/204 A, 210 R, 213 R, 217, 244, 219 R, 220 R, 248, 210 A

[56] References Cited

U.S. PATENT DOCUMENTS

| | | |
|---|---|---|
| 2,918,252 | 12/1959 | Haworth . |
| 3,262,676 | 7/1966 | Huebner, Jr. et al. . |
| 3,356,339 | 12/1967 | Thomas et al. . |
| 4,062,638 | 12/1977 | Hall, Jr. ............................ 416/244 A |
| 4,097,194 | 6/1978 | Barack et al. ................... 416/244 A |
| 4,102,603 | 7/1978 | Smith et al. ..................... 416/244 A |
| 4,203,705 | 5/1980 | Wesbecher ............................ 416/95 |
| 4,310,286 | 1/1982 | Peters et al. ..................... 416/198 A |
| 4,521,160 | 6/1985 | Bouiller et al. ..................... 416/218 |
| 4,536,932 | 8/1985 | Athey . |
| 4,784,572 | 11/1988 | Wovotny et al. ................ 416/213 R |
| 5,062,769 | 11/1991 | Ortolano ............................ 416/217 |

FOREIGN PATENT DOCUMENTS

| | | | |
|---|---|---|---|
| 740757 | 11/1955 | United Kingdom ................ 416/219 |
| 749279 | 5/1956 | United Kingdom ................ 416/217 |
| 891739 | 3/1962 | United Kingdom ................ 416/219 |

OTHER PUBLICATIONS

D. J. Nicholas, "The Wide-Chord Fan Blade-A Rolls-Royce First", Paper presented 15-19 Jun. 1987 (NTIS Order No. N88-10789), Title sheet and page containing FIG. 9b.

Intervia Aerospace Review, "Civil Engine Wars," Feb. 1991, pp. 11 & 12.

Flight International, figure on p. 1473, Dec. 3, 1983.

Primary Examiner—Thomas E. Denion
Attorney, Agent, or Firm—Jerome C. Squillaro

[57] ABSTRACT

A rotor assembly for supporting rotor blades includes a plurality of axially adjoining discrete disks each having a rim, web, and hub. The rims include axial dovetail grooves for collectively supporting a respective blade dovetail therein. Each of the disks includes at least one axially extending annular arm joined integrally with the disk and fixedly joined to an adjacent one of the arms. The disks are fixedly joined together solely by the blade dovetails in the rim dovetail grooves and by the arms so that upon a crack failure of one of the disks, centrifugal load from the failed disk is transferred to an adjacent disk.

21 Claims, 6 Drawing Sheets

MULTIPLE ROTOR DISK ASSEMBLY

TECHNICAL FIELD

The present invention relates generally to aircraft gas turbine engines, and, more specifically, to a bladed-rotor assembly, such as a fan, subject to cracking failure.

BACKGROUND ART

A conventional aircraft gas turbine engine includes a rotating fan having a plurality of circumferentially spaced fan blades removably mounted to a rotor. In one form, the rotor includes a disk having an outer rim and an inner hub with a radially extending web therebetween. The rim includes a plurality of circumferentially spaced, axially extending dovetail grooves for receiving axial dovetails of the fan blades for supporting the fan blades as they rotate with the disk.

A conventional rim has a width in the axial direction selected for ensuring acceptably low stress in the rim due to centrifugal loads imposed by the rotating blades on the rim. The width of the web is relatively smaller than that of the rim for minimizing weight of the disk, and the width of the hub is relatively larger than that of the web and may be up to about the width of the rim for providing suitable structural integrity of the entire disk.

Since the fan assembly has the largest outer diameter of the rotating blade rows of a conventional turbofan aircraft gas turbine engine, it typically has relatively high rotational energy due to centrifugal force or load generated thereby during operation. The larger the fan blades, the higher the potential centrifugal loads, and, therefore, the fans are typically run at relatively low rotational speeds to reduce the centrifugal loads so that stress generated thereby in the disk is below acceptable limits for obtaining a suitable useful life of the disk and avoiding catastrophic failure during operation.

Conventional rotor disks are known to fail due to propagating cracks under relatively high centrifugal loads. Cracks typically form at stress concentrations in the disk such as, for example, undetected inclusions in the disk, or at stress risers such as holes in the disk. Cracks may propagate circumferentially around the disk and may result in the rim separating from the web in one failure mode. In another failure mode, cracks may propagate in the radial direction through the hub, web, and rim thusly radially splitting the disk and resulting in failure.

Disks, therefore, are conventionally designed for obtaining limited stress therein due to centrifugal loads to reduce the likelihood of failure and for providing an acceptable service life. The disks may also be constructed in the form of a multi-disk assembly for spreading the centrifugal load between the respective disks so that failure of one disk does not result in failure of the entire multi-disk assembly.

In one exemplary turbofan engine, large fan blades are provided having a height of about 1 meter with the diameter of the fan assembly measured to the blade tips of about 3 meters. The fan rotates at about 2300 rpm, thusly resulting in substantial centrifugal loads imparted from the blades into the supporting rotor assembly. Accordingly, in order to prevent catastrophic failure of the rotor assembly having such relatively high centrifugal loads, an improved rotor assembly is desired which will prevent such failure and provide an indication of the onset of such failure in order to effect appropriate remedial action. Furthermore, in view of the relatively large centrifugal loading in such a fan, a simpler and more structurally efficient rotor assembly having reduced structural mass and reduced stress risers is desired.

OBJECTS OF THE INVENTION

Accordingly, one object of the present invention is to provide a new and improved rotor assembly for supporting rotor blades.

Another object of the present invention is to provide a rotor assembly for supporting large fan blades with improved structural efficiency.

Another object of the present invention is to provide a fan rotor assembly effective for inhibiting or arresting crack propagation for preventing complete rotor failure.

Another object of the present invention is to provide a fan rotor assembly having reduced stress risers therein.

DISCLOSURE OF INVENTION

A rotor assembly for supporting rotor blades includes a plurality of axially adjoining discrete disks each having a rim, web, and hub. The rims include axial dovetail grooves for collectively supporting a respective blade dovetail therein. Each of the disks includes at least one axially extending annular arm joined integrally with the disk and fixedly joined to an adjacent one of the arms. The disks are fixedly joined together solely by the blade dovetails in the rim dovetail grooves and by the arms so that upon a crack failure of one of the disks, centrifugal load from the failed disk is transferred to an adjacent disk.

BRIEF DESCRIPTION OF DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawings in which:

MODE(S) FOR CARRYING OUT THE INVENTION

Figure 1:
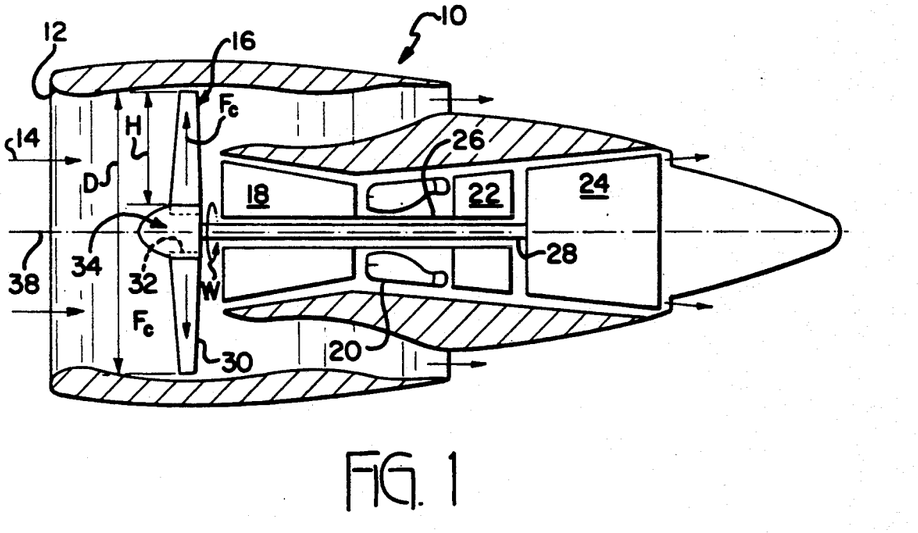
FIG. 1 is a schematic, longitudinal sectional view of an exemplary aircraft turbofan engine having a fan rotor assembly in accordance with one embodiment of the present invention.

Illustrated in FIG. 1 is an exemplary high bypass, turbofan gas turbine engine 10 having in serial flow communication an inlet 12 for receiving ambient air 14, a fan 16, a compressor 18, a combustor 20, a high pressure turbine 22, and a low pressure turbine 24. The high pressure turbine 22 is joined to the compressor 18 by a high pressure shaft 26, and the low pressure turbine 24 is connected to the fan 16 by a low pressure shaft, or drive shaft 28.

The fan 16 includes a plurality of circumferentially spaced rotor, or fan, blades 30 each having a conventional axial dovetail 32 supported to a rotor assembly 34 in accordance with one embodiment of the present invention. In a preferred and exemplary embodiment, each of the blades 30 has a height H of about 1 meter, and the fan 16 has an outer diameter D of about 3 meters measured between opposite blade tips. The low pressure turbine 24 is effective for rotating the rotor assembly 34 and the blades 16 at rotational speeds W of up to about 2300 rpm. The rotating blades 30 therefore generate considerable centrifugal loads or forces $F_c$ which must be accommodated by the rotor assembly 34.

In accordance with one object of the present invention, the rotor assembly 34 is constructed to arrest propagation of cracks therein prior to complete loss of structural integrity of the rotor assembly 34 supporting the blades 30. Crack propagation will occur to a point in which a notable unbalance or performance deterioration of the fan 16 will occur which may be conventionally detected so that appropriate remedial action such as shutting down the engine, for example, may be taken. The rotor assembly 34 will, however, continue to carry the centrifugal blade loading safely without complete destruction of the rotor assembly 34.

Figure 2:
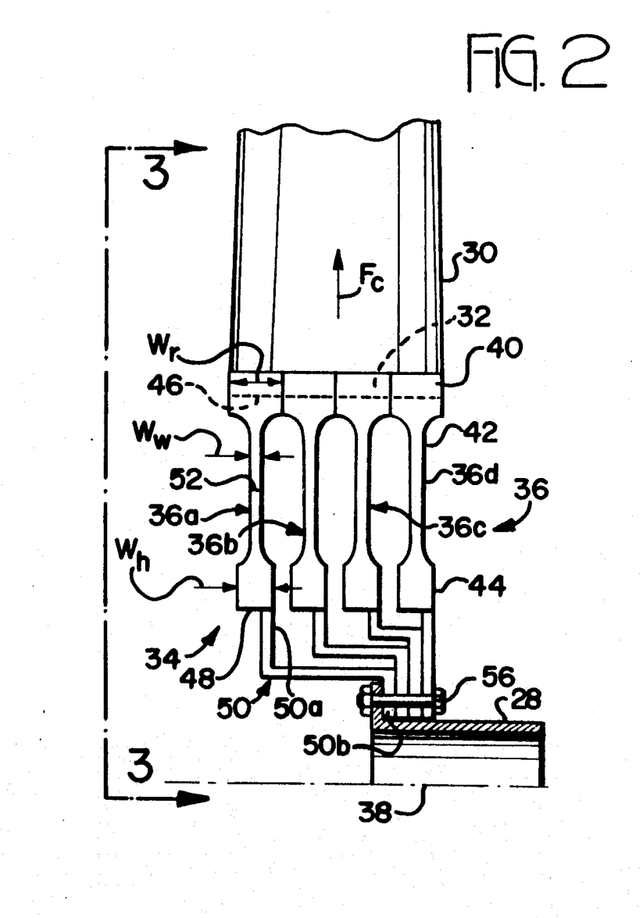
FIG. 2 is a longitudinal sectional view of one embodiment of the rotor assembly for the fan illustrated in FIG. 1.
Figure 3:
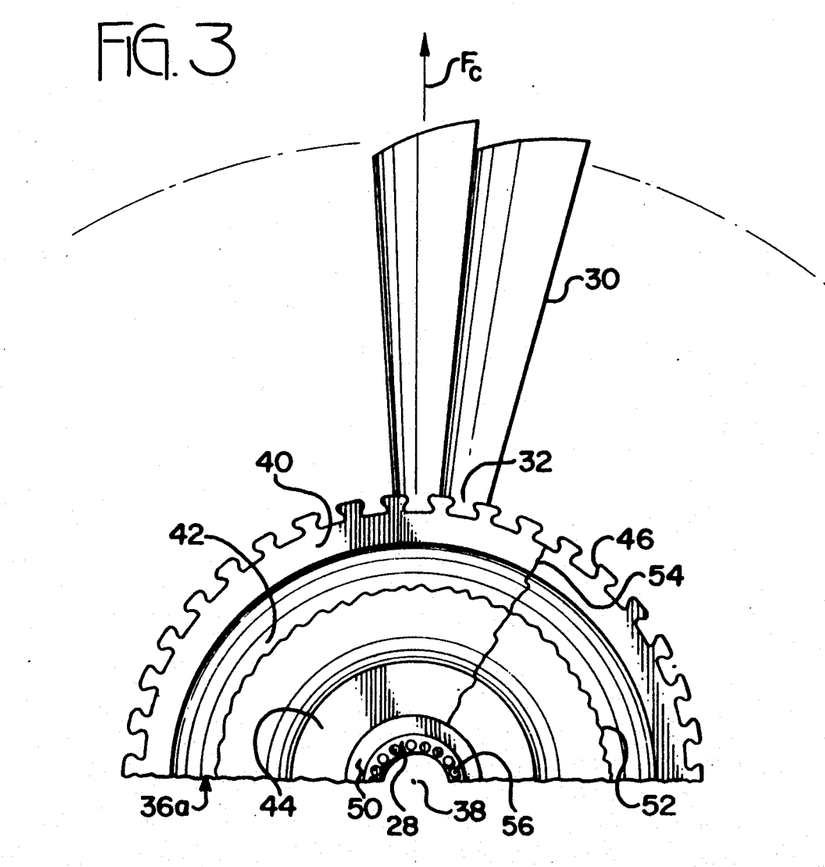
FIG. 3 is a radial, transverse view of the rotor assembly illustrated in FIG. 2 taken along line 3-3.

Illustrated in FIGS. 2 and 3 is an exemplary embodiment of the rotor assembly 34 having a plurality of axially adjoining, discrete disks 36, for example four disks 36a, 36b, 36c, and 36d. Each of the disks 36 is disposed coaxially about a longitudinal centerline axis 38 of the disks and engine 10. Each of the disks 36 is conventionally configured and is generally symmetrical about a radial axis to have a radially outer rim 40, a preferably imperforate web 42 extending radially inwardly from the rim 40, and an annular hub 44 extending radially inwardly from the web 42. Each of the rims 40 includes a plurality of circumferentially spaced, conventional axial dovetail grooves 46 with adjacent ones of the dovetail grooves 46 in adjacent ones of the disks 36 being axially aligned for collectively receiving and supporting a respective one of the blade dovetails 32, with each disk 36 supporting a share of the centrifugal load $F_c$ from the blades 30. Each of the blade rims 40 has a rim width $W_r$ conventionally selected for accommodating the centrifugal loads $F_c$ from the blades 30, with each of the rims 40 supporting a respective share of the total centrifugal load $F_c$.

Adjacent ones of the webs 42 are preferably axially spaced apart which is due in part to the webs 42 having a width $W_w$ conventionally smaller than that of the rim width $W_r$. Each of the hubs 44 has a hub width $W_h$ which is conventionally larger than the web width $W_w$ and may be up to about the rim width $W_r$. Each of the hubs 44 includes a conventional central bore 48 and is preferably imperforate from the bore 48 to the web 42.

Each of the disks 36 includes at least one axially extending, annular converting arm 50 having a proximal end 50a joined integrally with the disk 36, and having a distal end 50b fixedly joined to a respective distal end 50b of an adjacent arm 50 of an adjacent disk 36. Integral as used herein preferably means formed integrally during manufacture such as by being a single forging or casting, or by being integrally joined by conventional inertia welding for example. The arm 50 is thusly effective for converting, or transmitting, torque between adjacent disks 36.

In accordance with the present invention, the several disks 36 are fixedly joined together solely by the blade dovetails 32 in the rim dovetail grooves 46 and by the arms 50 so that upon a crack failure of one of the disks 36, the load share from the failed disk is transferred to an adjacent disk 36 through at least one of the blade dovetails 32 and adjacent ones of the arms 50. Crack failure as used herein simply means the propagation of a crack which decreases the load carrying capability of one of the disks 36 which will, therefore, allow the share of the centrifugal load $F_c$ from the failing disk 36 to be transferred to the adjacent disks. Failure also includes a crack extending completely through one of the disks 36.

For example, as shown in FIGS. 2 and 3, a circumferentially extending crack 52 may propagate circumferentially around one of the disk webs 42 resulting in a complete separation of the rim 40 attached thereto. In this mode of failure, the hub 44 will be restrained by the arm 50 connecting it to an adjacent disk 36 and the separated rim 40 will be restrained by the dovetails 32, with the centrifugal loads being transferred to the adjacent disks 36.

As illustrated in FIG. 3, a radially extending crack 54 may cause one of the disks 36 to separate from the bore 48 through the rim 40 destroying the hoop carrying capability of the disk 36. The centrifugal loads of this radially failed disk will be carried by both the arm 50 and the blade dovetail 32 to the adjacent disks 36.

In both failure modes described above, increased vibration of the fan 16 will occur which may be conventionally detected and followed by suitable remedial action.

In the embodiment illustrated in FIGS. 2 and 3, each of the arms 50 is joined integrally at their respective proximal ends 50a to the disk hubs 44, with all of the arms 50 being disposed inside the disk bores 48. In this way, each of the disks 36 remains substantially a conventional, discrete disk integrally joined together by the arms 50 without using conventional bolts and bolt holes through the disks 36 which would act as stress risers requiring conventional bosses to reduce stress at the holes.

Each of the disks 36 illustrated in FIG. 2 has a single arm 50, and adjacent ones of the arms 50 are joined together at the distal ends 50b by a plurality of circumferentially spaced conventional bolts 56. The arms 50 are preferably joined together by the bolts to the drive shaft 28 for rotating the disk 36 and the blades 30. In this way, conventional bolts and bolt holes for joining the drive shaft 28 directly to the disks 36 is avoided.

Figure 4:
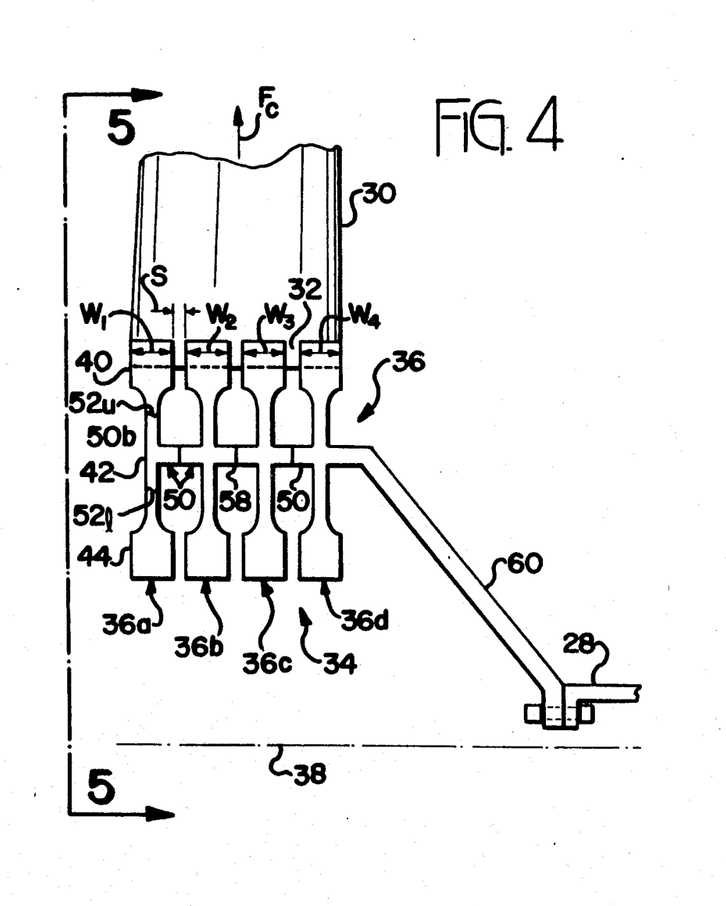
FIG. 4 is a longitudinal sectional view of another embodiment of the rotor assembly for the fan illustrated in FIG. 1.
Figure 5:
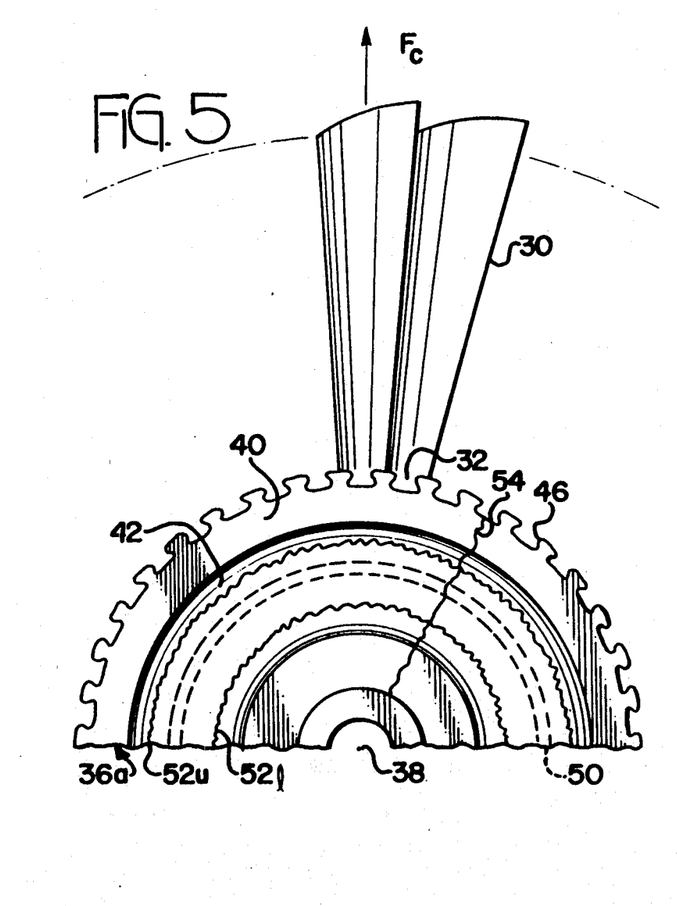
FIG. 5 is a radial, transverse view of the rotor assembly illustrated in FIG. 4 taken along line 5—5.

Illustrated in FIGS. 4 and 5 is another embodiment of the present invention similarly having a plurality of the axially adjoining disks 36, again four disks for example, with each of the arms 50 being joined integrally with the disk webs 42. Each of the arms 50 is spaced radially, and generally equidistantly, between the rims 40 and the hubs 44 with the adjacent arm distal ends 50b being fixedly joined together by welds such as by conventional inertia welding. In this embodiment, the arms 50 are preferably cylindrical and extend parallel to the longitudinal centerline axis 38 and perpendicularly to the webs 42. The axially inner ones of the disks, i.e. 36b and 36c, each includes two of the arms 50 extending axially oppositely to each other, and each arm 50 is fixedly joined to an adjacent arm 50 of an adjacent disk 36.

For a circumferential crack such as a radially upper crack $52_u$ extending between the rim 40 and the arms 50, the arms 50 will restrain the web 42 below the crack $52_u$ and restrain the hub 44, while the blade dovetails 32 will restrain the rim 40 and the web 42 above the crack $52_u$. For a radially lower circumferential crack $52_l$ extending between the arms 50 and the hub 44, both the arms 50 and the blade dovetails 32 joined to the web 42 and the rim 40, respectively, above the lower crack $52_l$ remain effective for restraining those components upon separation of the web 44.

FIG. 4 also illustrates that the width of the respective rims 40, i.e. $W_1$, $W_2$, $W_3$, $W_4$, may be reduced for creating axial spaces S between the respective rims 40 for both eliminating dead weight from the rims 40 for reducing stress, and for increasing the surface-to-volume ratio of the individual disks 36 so that a conventional surface etch to reveal micro structural anomalies has a substantially increased potential to uncover problems before parts are placed in service. The spacing between the adjacent disks 36 also allows for improved ability to inspect for cracks during routine maintenance. An additional advantage due to the relatively thin disks 36 in the embodiment illustrated in FIG. 4 is that thinner disks 36 reduce the volume in which inclusions may be found, and any inclusions therein will necessarily be closer to the surface of the disks 36 increasing the potential for surface etching to detect such inclusions or stress risers. Although the dovetails 32 merely hang between adjacent ones of the spaced rims 40, the rims 40 are nevertheless able to accommodate the blade centrifugal loads $F_c$.

The aft-most end one of the disks 36, i.e. disk 36d, preferably includes an integral drive cone 60 conventionally fixedly joined to the drive shaft 28, by bolts for example. The drive cone 60 is also preferably integrally joined to the end disk 36d axially opposite to the arm 50 thereof for providing a direct load path for driving the respective disks 36 and the blades 30 supported thereby. Again in this embodiment of the invention, the several disks 36 are fixedly joined together without bolts or bolt holes extending through the disks 36 themselves which would require bosses for reducing the increased stress therefrom, which adds weight and complexity.

Figure 6:
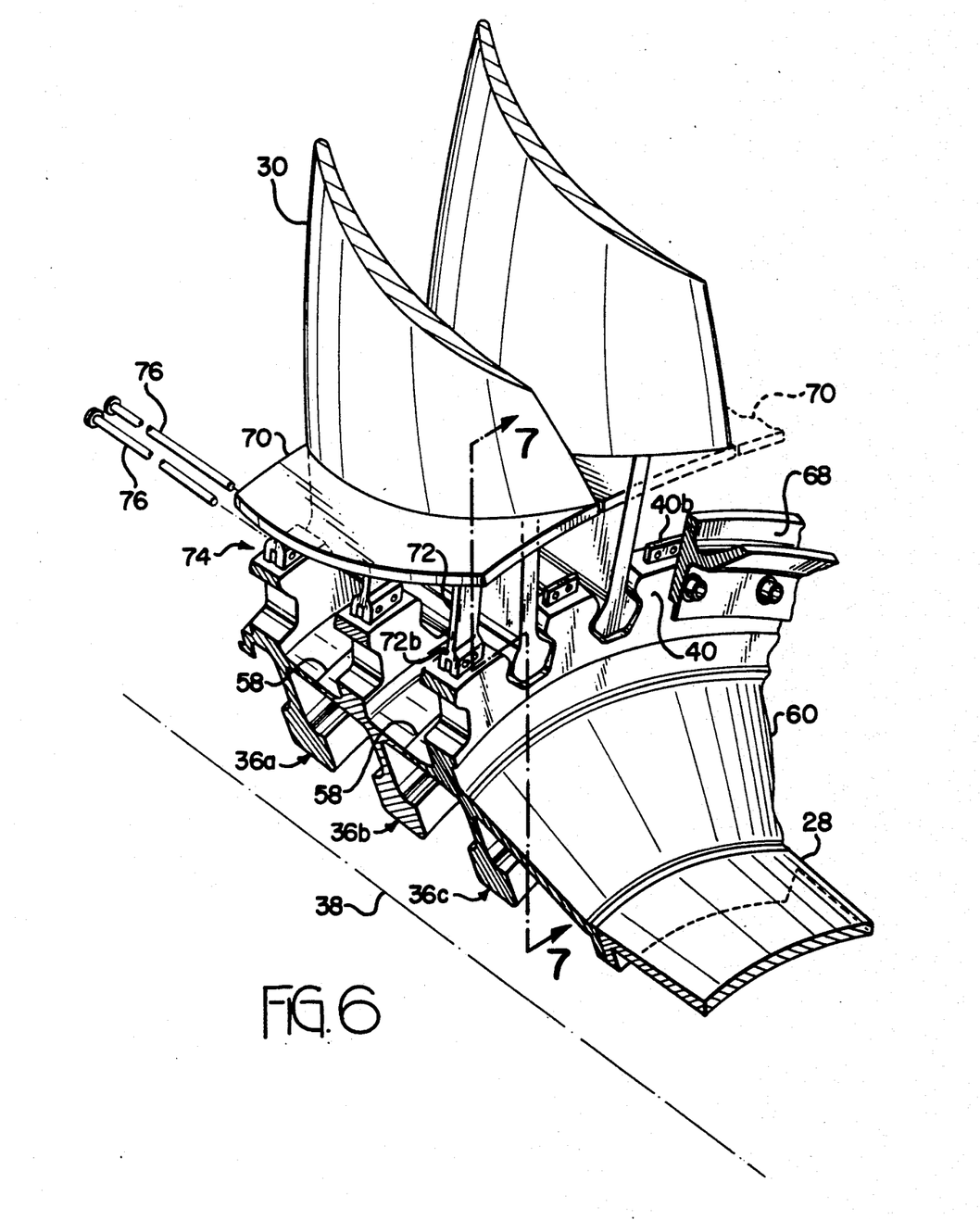
FIG. 6 is a perspective view of a portion of another embodiment of the rotor assembly illustrated in FIG. 1.
Figure 7:
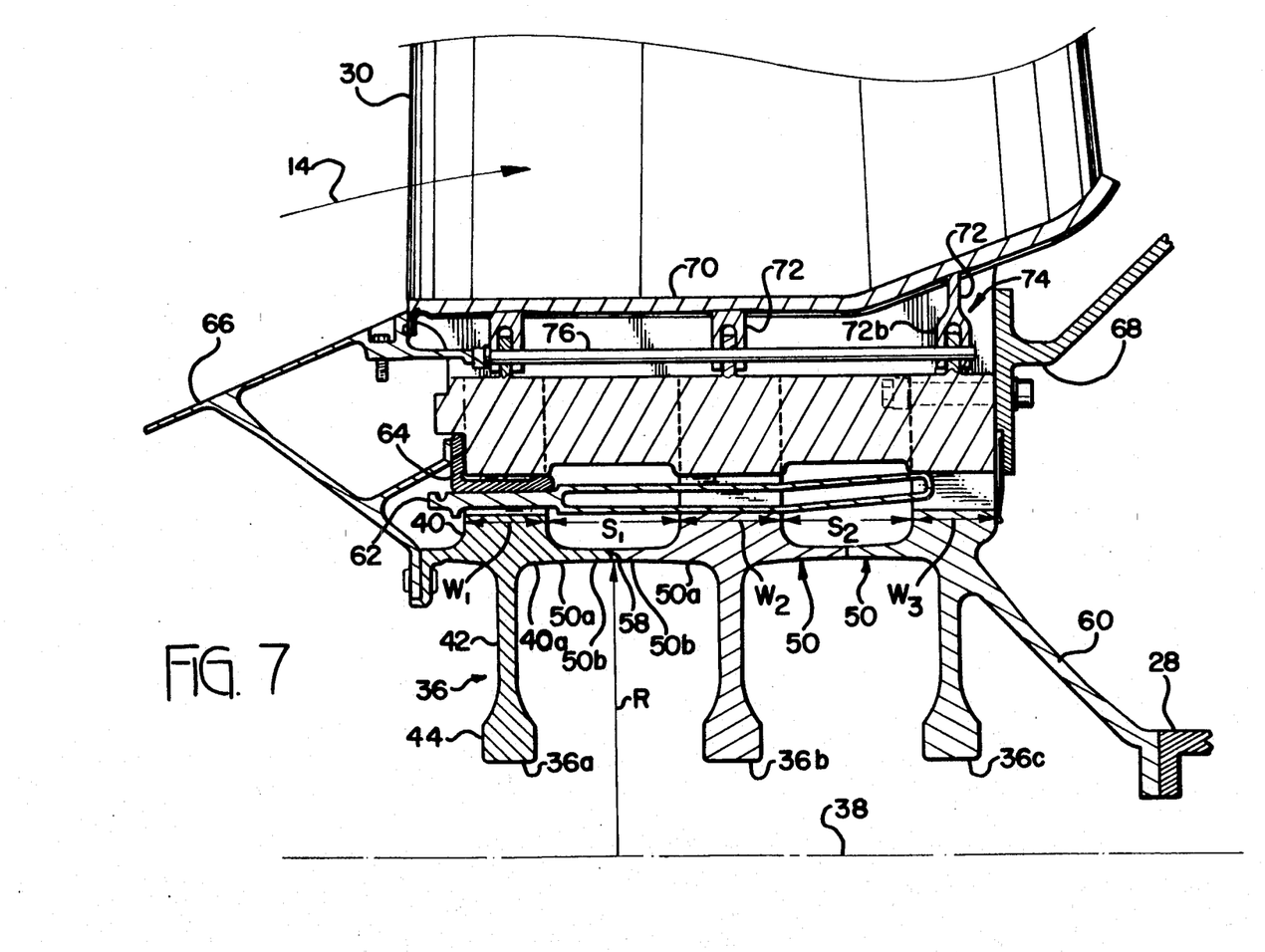
FIG. 7 is a longitudinal sectional view of the rotor assembly illustrated in FIG. 6 taken along line 7—7.

Illustrated in FIGS. 6 and 7 is another embodiment of the present invention wherein the arms 50 are joined integrally with the disk rims 40. The embodiment illustrated in FIGS. 6 and 7 is generally similar to the embodiment illustrated in FIGS. 4 and 5 except that the arms 50 are joined to the rims 40 at radially inner bases 40a thereof at a radius R from the centerline axis 38. In this embodiment, only three disks 36 are used, i.e., 36a, 36b, and 36c, with the arms 50 also being cylindrical, extending parallel to the centerline axis 38 and perpendicularly to the rims 40. The arm distal ends 50b are also fixedly joined together by inertia welds 58. The drive cone 60 is also integrally joined to the end disk 36c axially opposite to the arm 50 thereof for providing a direct load path through the respective arms 50 for rotating the disks 36.

By locating the arms 50 as high as possible in the disks 36 for example at the middle of the webs 42 as illustrated in FIG. 4, or at the rim bases 40a at the radius R as illustrated in FIG. 7, the arms 50 have a relatively large diameter and since they are cylindrical structures they are more effective for transferring loads between adjacent ones of the disks. Accordingly they may be made relatively thin in the radial direction while at the same time experiencing relatively low stress for inhibiting, or preventing, propagation of cracks from disk-to-disk for ensuring structural integrity of the entire rotor assembly 34 in the event of failure of any one of the disks 36. Although at least two disks 36 may be utilized in accordance with the invention, at least three disks 36 are preferred for providing redundancy and for accommodating the substantially large centrifugal force $F_c$ generated by the rotating blades 30.

In this embodiment also, the widths $W_1$, $W_2$, and $W_3$ of the several disks 36 are also relatively thin for axially spacing apart the several rims 40 at axial spaces $S_1$, and $S_2$ for the same reasons as presented above.

In this embodiment, a conventional anticlank spring 62 is inserted in each of the dovetail grooves 46 below a respective dovetail 32 for urging the upper ends of the dovetails 32 upwardly in contact with the conventional dovetail tangs for preventing clanking or rattling of the blades 32 as they rotate at slow speed. A conventional key 64 is inserted between the forward end of the dovetail 32 and the spring 62 and is retained therein by a conventional spinner 66 of the fan 16 which also axially retains the dovetails 32 in the groove 46. A conventional blade aft retainer 68 is conventionally bolted to the aft rim 40 for securing the blades 32 axially within the grooves 46.

In this embodiment of the invention, a plurality of flow platforms 70, which define the inner boundary of the air 14 channeled through the fan 16, are each disposed between adjacent ones of the blades 30. Each platform 70 is a discrete component including a plurality of radially inwardly extending supporting beams 72 having a distal end 72b defining with the perimeter of a respective one of the rims 40, a clevis joint 74 for supporting the platform 70 to the disk 36. In the embodiment illustrated in FIGS. 6 and 7, the supporting beam distal ends 72b are U-shaped, and the rims 40 include complementary, circumferentially extending tongues 40b for forming the clevis joint 74. A pair of circumferentially spaced, elongate pins 76 extend through holes in the beam distal ends 72b and the rim tongues 40b to complete the clevis joints 74 for securing the platform 70 to the rims 40.

Figure 8:
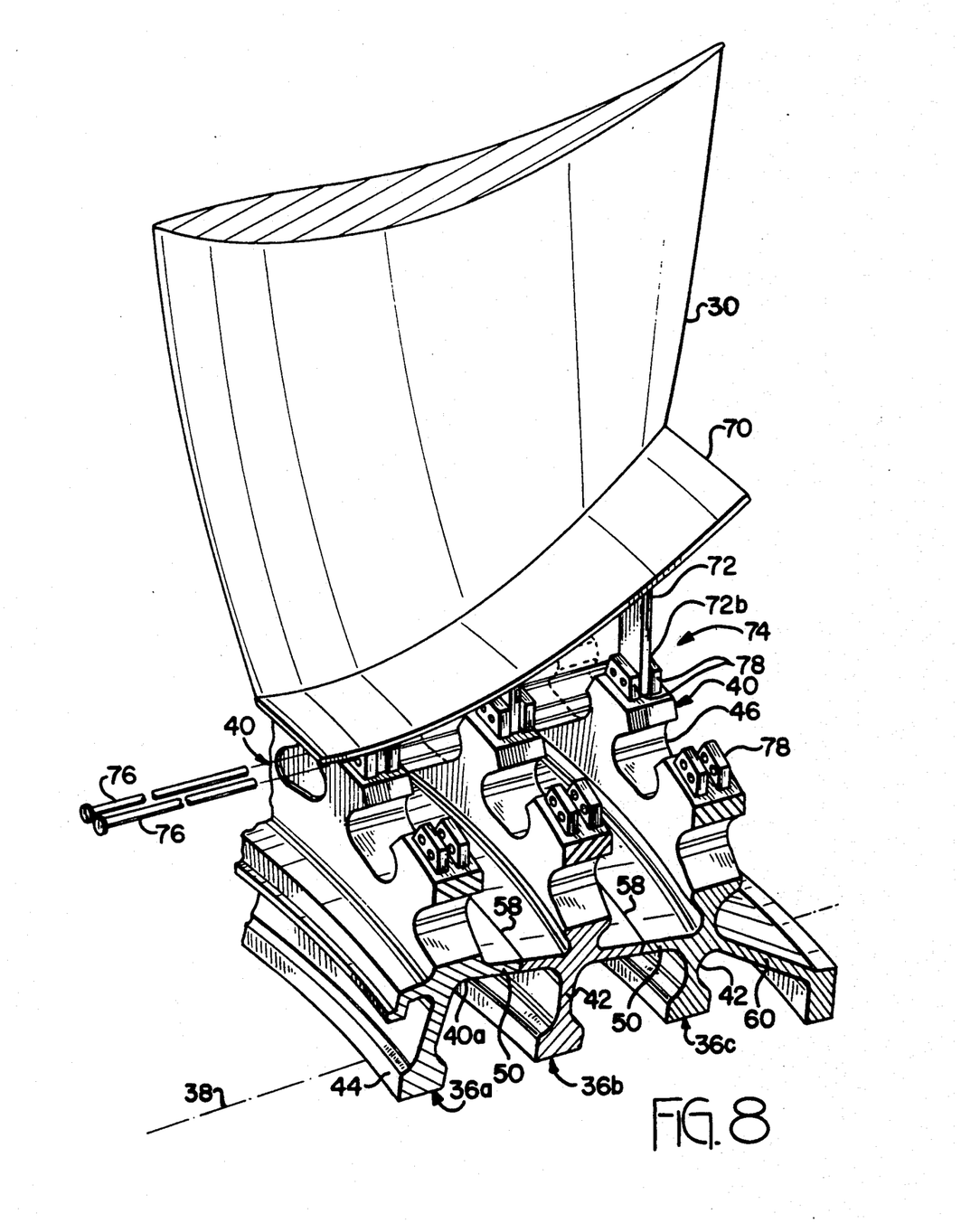
FIG. 8 is a perspective view of a portion of another embodiment of the rotor assembly illustrated in FIG. 1.

Illustrated in FIG. 8 is another embodiment of the present invention wherein the clevis joints 74 are constructed oppositely to those illustrated in FIG. 6. In this embodiment, the rims 40 include pairs of axially spaced, circumferentially extending clevis flanges 78, and the supporting beam distal ends 72b are disposed between respective ones of the clevis flanges 78 for defining the clevis joints 74. Again, the pins 76 extend axially through both the clevis flanges 78 and the beam distal ends 72 for securing the platform 70 to the rims 40.

The embodiment illustrated in FIG. 8 also shows that the arms 50 may instead of being cylindrical as illustrated in FIGS. 4 and 7 for example, may be conical and inclined rearwardly with the respective arms 50 extending from the rim base 40a of the first disk 36a to the top of the web 42 of the second disk 36b to the middle of the web 42 of the third disk 36c, with the drive cone 60 being integrally joined oppositely thereto.

In all of the above embodiments of the invention, the respective disks 36 remain discrete, preferably conventionally hour-glass shaped, without stress raising holes from the bores 48 to the dovetail grooves 46 of the rims 40 for reducing stress therein. The arms 50 are preferably integrally joined with the respective disks 36 by either being forged or cast therewith, or inertia welded thereto, and cooperate therewith for reducing stress risers and reducing the likelihood of crack propagation from one disk 36 to an adjacent disk 36 through the arms 50. With the cooperation of the single dovetails 32 being disposed in the respective grooves 46 of the adjacent rims 40, two load paths are provided between respective ones of the disks for transferring centrifugal loads upon the failure of one of the disks. And, most significantly, the relatively thin arms 50 can be designed for obtaining low stress therein which can inhibit or prevent crack propagation from one disk to an adjacent disk. The ability to axially space apart the respective disks as disclosed above allows for the removal of dead weight, decreases the likelihood of inclusions therein, and increases the surface-to-volume ratio for improving inspection capabilities by using conventional surface etching for example.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A rotor assembly for supporting a plurality of circumferentially spaced rotor blades each having an axial dovetail comprising:
   a plurality of axially adjoining discrete disks each having a radially outer rim, an imperforate web extending radially inwardly from said rim, and a hub extending radially inwardly from said web;
   each of said rims including a plurality of circumferentially spaced, axial dovetail grooves, adjacent ones of said dovetail grooves of adjacent disks being axially aligned for collectively supporting a respective one of said blade dovetails with each disk supporting a share of centrifugal load from said blades;
   adjacent ones of said webs being axially spaced apart;
   each of said hubs having a central bore and being imperforate from said bore to said web;
   each disk including at least one axially extending, annular arm joined integrally with said disk and having a distal end fixedly joined to a respective distal end of an adjacent arm of an adjacent disk; and
   said disks being fixedly joined together solely by said blade dovetails in said rim dovetail grooves and by said arms so that upon a crack failure of one of said disks, said load share from said failed disk is transferred to an adjacent disk through at least one of said blade dovetail and adjacent ones of said arms.

2. A rotor assembly according to claim 1 wherein said arms are joined integrally with said disk hubs.

3. A rotor assembly according to claim 2 wherein each of said disks includes a single arm and adjacent ones of said arms are joined together at said distal ends by a plurality of circumferentially spaced bolts.

4. A rotor assembly according to claim 3 wherein said arms are disposed inside said hub bores.

5. A rotor assembly according to claim 4 wherein said arms are joined together by said bolts to a drive shaft for rotating said disks and said blades.

6. A rotor assembly according to claim 1 wherein said arms are joined integrally with said disk webs.

7. A rotor assembly according to claim 6 wherein said arms are spaced radially between said rims and said hubs.

8. A rotor assembly according to claim 7 wherein said arm distal ends are fixedly joined together by welds.

9. A rotor assembly according to claim 8 wherein said arms are cylindrical and extend parallel to a longitudinal centerline axis of said disks and perpendicularly to said webs.

10. A rotor assembly according to claim 9 wherein an inner one of said disks includes two of said arms extending axially oppositely, and each arm being fixedly joined to an adjacent arm of an adjacent disk.

11. A rotor assembly according to claim 10 wherein an end one of said disks includes an integral drive cone fixedly joinable to a drive shaft, said drive cone being integrally joined to said end disk axially opposite to said arm thereof.

12. A rotor assembly according to claim 11 wherein said disk rims are axially spaced apart.

13. A rotor assembly according to claim 1 wherein said arms are joined integrally with said disk rims.

14. A rotor assembly according to claim 13 wherein said arms are cylindrical and extend parallel to, a longitudinal centerline axis of said disks and perpendicularly to said rims at a base thereof.

15. A rotor assembly according to claim 14 wherein said arm distal ends are fixedly joined together by welds.

16. A rotor assembly according to claim 15 wherein an inner one of said disks includes two of said arms extending axially oppositely, and each arm being fixedly joined to an adjacent arm of an adjacent disk.

17. A rotor assembly according to claim 16 wherein an end one of said disks includes an integral drive cone fixedly joined to a drive shaft, said drive cone being integrally joined to said end disk axially opposite to said arm thereof.

18. A rotor assembly according to claim 17 wherein said disk rims are axially spaced apart.

19. A rotor assembly according to claim 18 further including a plurality of platforms each disposed between adjacent ones of said blades and each including a plurality of radially inwardly extending supporting beams, each supporting beam having a distal end defining with a perimeter of a respective one of said rims a clevis joint for supporting said platform to said disk.

20. A rotor assembly according to claim 19 wherein said supporting beam distal ends are U-shaped and said rims include complementary circumferentially extending tongues for forming said clevis joints.

21. A rotor assembly according to claim 19 wherein said rims include pairs of axially spaced, circumferentially extending clevis flanges, and said supporting beam distal ends are disposed between respective ones of said clevis flanges for defining said clevis joints.

* * * * *